United States Patent
Liao et al.

(10) Patent No.: US 7,757,222 B2
(45) Date of Patent: Jul. 13, 2010

(54) GENERATING EFFICIENT PARALLEL CODE USING PARTITIONING, COALESCING, AND DEGENERATIVE LOOP AND GUARD REMOVAL

(75) Inventors: Shih-wei Liao, San Jose, CA (US); Zhao Hui Du, Shanghai (CN); Bu Qi Cheng, Beijing (CN); Gansha Wu, Beijing (CN); Guei-Yuan Lueh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1321 days.

(21) Appl. No.: 11/239,818

(22) Filed: Sep. 30, 2005

(65) Prior Publication Data

US 2007/0079281 A1    Apr. 5, 2007

(51) Int. Cl.
*G06F 9/45* (2006.01)
(52) U.S. Cl. .................. 717/140; 717/149; 717/150; 717/151; 717/159; 717/160
(58) Field of Classification Search .............. 717/106, 717/140, 149, 150, 151, 159, 160
See application file for complete search history.

(56) References Cited

U.S. PATENT DOCUMENTS

| | | | |
|---|---|---|---|
| 5,584,027 A | 12/1996 | Smith | |
| 5,704,053 A | 12/1997 | Santhanam | |
| 5,781,777 A | 7/1998 | Sato et al. | |
| 5,953,531 A | 9/1999 | Megiddo et al. | |
| 6,058,266 A | 5/2000 | Megiddo et al. | |
| 6,226,790 B1 * | 5/2001 | Wolf et al. .................. | 717/135 |
| 6,374,403 B1 | 4/2002 | Darte et al. | |
| 6,507,947 B1 | 1/2003 | Schreiber et al. | |
| 6,567,976 B1 * | 5/2003 | Wolf ........................... | 717/160 |
| 6,772,415 B1 | 8/2004 | Danckaert et al. | |
| 6,952,821 B2 | 10/2005 | Schreiber | |
| 7,086,038 B2 * | 8/2006 | Cronquist et al. ........... | 717/136 |
| 7,367,024 B2 | 4/2008 | Barua et al. | |
| 7,487,497 B2 | 2/2009 | Ren et al. | |
| 2005/0188364 A1 * | 8/2005 | Cockx et al. ................ | 717/159 |
| 2006/0031652 A1 | 2/2006 | Richter et al. | |
| 2006/0080645 A1 | 4/2006 | Miranda et al. | |
| 2006/0123405 A1 | 6/2006 | O'Brien et al. | |
| 2007/0074195 A1 | 3/2007 | Liao et al. | |

OTHER PUBLICATIONS

Kajariwal et al., "A Novel Approach for Partitioning Iteration Spaces with Variable Densities", Jun. 15-17, 2005, PPoPP'05, pp. 120-131.*
Daniel Chavarria-Miranda et al., "Effective Communication Coalescing for Data-Parallel Applications", Jun. 15-27, 2005, PPoPP'05, pp. 14-25.*

(Continued)

*Primary Examiner*—Wei Y Zhen
*Assistant Examiner*—Chih-Ching Chow
(74) *Attorney, Agent, or Firm*—Blakely, Sokoloff, Taylor & Zafman LLP

(57) ABSTRACT

Code is affine partitioned to generate affine partitioning mappings. Parallel code is generated based on the affine partitioning mappings. Generating the parallel code includes coalescing loops in the parallel code generated from the affine partitioning mappings to generate coalesced parallel code and optimizing the coalesced parallel code.

14 Claims, 8 Drawing Sheets

OTHER PUBLICATIONS

Christine Eisenbeis et al., "A strategy for array management in local memory", Apr. 5, 1993, Mathematical Programming 63 (1994) pp. 331-370.*

Pande et al., "Compiler optimizations for scalable parallel systems: Languages, Compilation Techniques, and Run Time Systems", 2001, Springer, pp. 366, section 4.1 "Affine Processor Mapping".*

Wikipedia SDRAM definition, Aug. 11, 2005, pp. 1-6. http://web.archive.org/web/20050811084256/hhtp://en.wikipedia.org/wiki/SDRAM.*

Amy W. Lim, et al., "Maximizing Parallelism and Minimizing Synchronization with Affine Transforms", Jan. 1997, $24^{th}$ Annual ACM SIGPLAN-SIGACT Symposium on Principles of Programming Languages, pp. 1-14.*

Amy W. Lim, "Improving Parallelism and Data Locality with Affine Partitioning", Aug. 2001, A Dissertation of Computer Science department of Stanford University, pp. 1-151.*

Amy W. Lim, et al., "Blocking and Array Contraction Across Arbitrarily Nested Loops Using Affine Partitioning", Jun. 18-20, 2001, ACM PPOPP'01 Snowbird, Utah, USA, pp. 1-10.*

Wolf et al., "A Loop Transformation Theory and an Algorithm to Maximize Parallelism", IEEE Transactions on Parallel And Distributed Systems, vol. 2, No. 4, Oct. 1991; pp. 452-471.*

Ancourt, Corinne et al., "Scanning Polyhedra with DO Loops," in: *3rd ACM SIGPLAN Symposium on Principles and Practice of Parallel Programming*, Jun. 1991, pp. 1-12.

Lim, Amy W. et al., "Maximizing Parallelism and Minimizing Synchronization with Affine Transforms," in: *Conference Record of the $24^{th}$ Annual ACM Symposium on Principles of Programming Languages*, 1997, pp. 1-14.

Hall, Mary W. et al., "Maximizing Multiprocessor Performance with the SUIF Compiler," *Digital Technical Journal*, vol. 10, No. 1, 1998, pp. 71-80.

Lim, Amy W. et al., "Maximizing Parallelism and Minimizing Synchronization with Affine Partitions," *Parallel Computing*, vol. 24, 1998, pp. 445-475.

Lim, Amy W. et al., "Blocking and Array Contraction Across Arbitrarily Nested Loops Using Affine Partitioning," in: *Proceedings of the 8th ACM SIGPLAN Symposium on Principles and Practice of Parallel Programming*, Jun. 2001.

Lim, Amy W., et al., "An Affine Partitioning Algorithm to Maximize Parallelism and Minimize Communication", Computer Systems Laboratory, Stanford University, 1999, (1999), pp. 1-10.

* cited by examiner

```
for J = 1 to n
  for K = 1 to n
    A[J, K] = B[J, K]     (S1)
    C[J, K] = A[K, J]     (S2)
```

WHERE n = 2

$\Phi_1(J,K) = J$     (AE1)

$\Phi_2(J,K) = K$     (AE2)

```
for J = 1 to n
  for K = 1 to n
    A[J, K] = A[J, K] + B[J-1, K]    (S3)
    B[J, K] = A[J, K-1] * B[J, K]    (S4)
```

$\Phi_1(J,K) = J - K$      (AE3)

$\Phi_2(J,K) = J - K + 1$      (AE4)

```
for P = 1-n to n                    P3 (PARALLELIZED
  for J = 1 to n                        CODE FOR S3)
    for K = 1 to n
      A[J, J-P] = A[J, J-P] + B[J-1, J-P] when P == J-K
```

```
for P = 1-n to n                    P4 (PARALLELIZED
  for J = 1 to n                        CODE FOR S4)
    for K = 1 to n
      B[J, J-P+1] = A[J, J-P] * B[J, J-P+1 ] when P == J-K+1
```

FIG. 7

```
for P = 1-n to n
  for J = 1 to n
    for K = 1 to n
      if (P == J-K)                              (E3)  ◄── 802 GUARD
        A[J, J-P] = A[J, J-P]+B[J-1, J-P]        (S3)
      if (P == J-K+1)                            (E4)  ◄── 804 GUARD
        B[J, J-P+1] = A[J, J-P]*B[J, J-P+1]      (S4)
```

FIG. 8

```
for P = 1-n to n
  for J = 1 to n
    K1 = J-P
    if (1 ≤ K1 ≤ n)   ◄── 1006
      A[J, J-P] = A[J, J-P]+B[J-1, J-P]   ◄── 1002
    K2 = J-P+1
    if (1 ≤ K2 ≤ n)   ◄── 1008
      B[J, J-P+1] = A[J, J-P]*B[J, J-P+1]   ◄── 1004
```

FIG. 10

For each statement S ⟵ 902
For each loop level J for S ⟵ 904
  If S is degenerate with respect to the loop level J ⟵ 906
  Then
    Solve the expression guarding S for J and assign the solution to J' ⟵ 908
    Replace the degenerate loop J with J' ⟵ 910
    Add the guard on J' to honor the bounds of degenerate loop J ⟵ 912
    Break
  End For
End For

FIG. 9

```
for P = 1-n to n
        if (P ≥ 1)
1102        B[P, 1] = A[P, 0]*B[P, 1]
        for J = MAX(1, P+1) to MIN(n, P+n-1)
            A[J, J-P] = A[J, J-P]+B[J-1, J-P]
            B[J, J-P+1] = A[J, J-P]*B[J, J-P+1]
        if (P ≤ 0)
1104        A[P+n, n] = A[P+n, n]+B[P+n-1, n]
```

FIG. 11

```
                                    1202
for P = 1-n to n
    if (P == 1-n)
        A[1, n] = A[1, n] + B[0, n]
    if (2-n ≤ P ≤ n-1)
        if (1 ≤ P ≤ n-1)
            B[P, 1] = A[P, 0]*B[P, 1]
        for J = MAX(1, P+1) to MIN(n, P+n-1)
            A[J, J-P] = A[J, J-P]+B[J-1, J-P]
            B[J, J-P+1] = A[J, J-P]*B[J, J-P+1]
        if (2-n ≤ P ≤ 0)
            A[P+n, n] = A[P+n, n]+B[P+n-1, n]
    if (P == n)
        B[n, 1] = A[n, 0]*B[n, 1]
```

FIG. 12

GENERATING EFFICIENT PARALLEL CODE USING PARTITIONING, COALESCING, AND DEGENERATIVE LOOP AND GUARD REMOVAL

CROSS-REFERENCE TO RELATED APPLICATIONS

This application is related to commonly-assigned applications "Splitting the Computation Space to Optimize Parallel Code", U.S. patent application Ser. No. 11/241,396, filed Sep. 30, 2005, and "Systems and Methods for Affine-Partitioning Programs onto Multiple Processing Units," U.S. patent application Ser. No. 11/241,260, filed Sep. 30, 2005.

TECHNICAL FIELD

Embodiments of the invention relate to the field of compilers and more specifically, but not exclusively, to generating efficient parallel code using partitioning, coalescing, and degenerative loop and guard removal.

BACKGROUND

Multiprocessors, which herein include multi-core processors, are becoming more widespread in the computer industry. As such, to optimize performance on multiprocessors, software programs need to be parallelized to take full advantage of parallel execution. Programs may be written using sequential programming and then compiled with a parallelizing compiler to produce the parallel code. Parallelizing compilers locate computations in the sequential code that can execute independently in parallel.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 7 shows parallel code in accordance with an embodiment of the present invention.

FIG. 8 shows stencil code in accordance with an embodiment of the present invention.

FIG. 9 shows pseudo-code in accordance with an embodiment of the present invention.

FIG. 10 shows stencil code in accordance with an embodiment of the present invention.

FIG. 11 shows stencil code in accordance with an embodiment of the present invention.

FIG. 12 shows conventional generated parallel code.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in direct contact (physically, electrically, magnetically, optically, etc.). "Coupled" may also mean two or more elements are not in direct contact with each other, but still cooperate or interact with each other.

To generate efficient and scalable parallel code, powerful mappings and efficient code generation is needed. Mappings or partitions refer to the decomposition of computation and data unto multiple processors (or cores). Unfortunately, powerful mappings and efficient code generations are oftentimes at odds with each other. That is, if you develop a powerful statement-level unifying framework for finding mappings such as affine mappings, the generated code after applying the framework tends to contain more loop levels and complex conditional expressions. The "unifying framework" uniformly models a large class of high-level optimizations such as loop interchange, reversal, skewing, fusion, fission, re-indexing, scaling, and statement reordering.

Embodiments of the invention provide efficient parallel code generation under a powerful mapping framework. Thus, the quality of generated code is not sacrificed; embodiments herein optimize away extra loop levels and complex conditional expressions. The presence of the extra loop levels and complex conditional expressions loop impact not only performance but also code readability and debuggability for both programmers and compiler developers.

Figure 1:
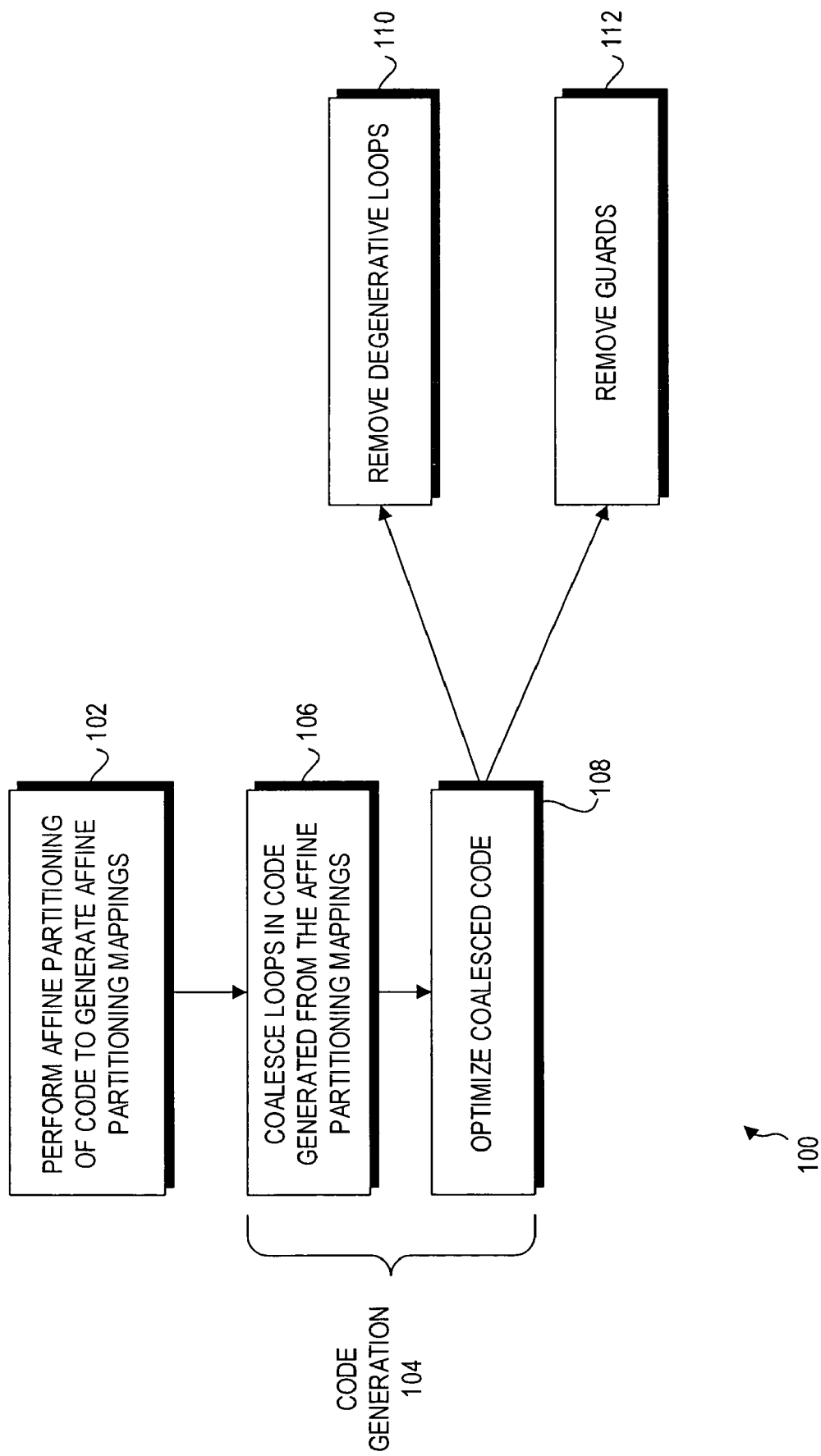
FIG. 1 is a flowchart illustrating the logic and operations to generate efficient parallel code in accordance with an embodiment of the present invention.

Turning to FIG. 1, a flowchart 100 in accordance with an embodiment of the invention is shown. In one embodiment, the logic and operations of flowchart 100 may be part of a parallelizing compiler. In another embodiment, flowchart 100 may be implemented as computer-accessible instructions executable by a computer system.

Starting in a block 102, affine partitioning is performed on code, such as source code, to generate affine partition mappings of the code. The code may include sequential code or non-optimized parallel code. As described in further detail below, affine partitioning (also referred to as affine transformation) analyzes the code to find computations of the code, such as loops, that may be partitioned across processors.

After block 102, the logic proceeds to code generation, as shown at 104. In one embodiment, the code generated includes Single Program Multiple Data code (SPMD) code. In SPMD code, processes execute the same code but use different data. Hence, SPMD code is often used for parallel code because the processes may be partitioned to multiple processors for independent execution.

The generated code may be used for analysis and debugging by programmers of the inserted code. The generated code may also be used by compiler writers to analyze the performance of the code generation scheme. In one embodiment, the generated code may be referred to as intermediate code. The intermediate code may be further compiled into object code for a targeted multiprocessor computer system.

Code generation 104 may include coalescing and optimizing. In one embodiment, the coalescing and optimizing is performed on SPMD code as part of code generation 104. As shown in a block 106, the loops in code generated from the affine partition mappings are coalesced. The coalescing adds guards and coalesces loops of the code.

Continuing to a block 108, the coalesced code is optimized. Optimizing 108 may include removing degenerative loops from the code, shown in a block 110. Optimizing 108 may also include removing guards from the code, as shown in a block 112. Thus, the inserted code is partitioned into several optimized partitions which may be dispatched to different processors and executed concurrently in a multiprocessor system.

Affine Partitioning

In parallelizing compilers, the compiler may re-organize the computations so that each processor (or core) may re-use data efficiently. This reduces the working set on each processor, and thus, minimizes capacity misses. The re-organization also minimizes sharing misses because of reduced interprocessor communication. To optimize data re-use, a compiler may use a technique called affine partitioning.

In affine partitioning, an iterative instance is identified by the value of the loop indices in enclosed loops. An affine partitioning scheme includes mappings, one for each operation in the program, from the original index variables to values of index variables in the transformed code. Operations with common enclosing loops share the same loop index variables. Operations described herein include statements.

The affine partitioning may find two types of affine partitions: space partitions and time partitions. Space partitioning places operations belonging to different independent threads in different space partitions. Operations belonging to the same space partition are mapped to the same processor (or core). If a program does not have any independent threads, the computations are divided into time partitions such that completing the partitions in order will satisfy the data dependencies. Embodiments of code generation described herein operate on affine space-partitioning mappings. The term "partition" herein refers to a space-partition.

To illustrate an embodiment of affine partitioning, the copy-transpose code of FIG. 2A will be discussed. However, it will be understood that embodiments of code generation of the invention are not limited to copy-transpose computations.

Figures 2A, 2B, 3:
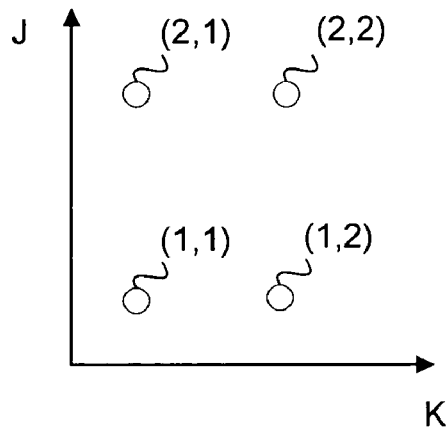
FIG. 2A shows copy-and-transpose code in accordance with an embodiment of the present invention.
FIG. 2B shows an array in accordance with an embodiment of the present invention.
FIG. 3 shows affine expressions in accordance with an embodiment of the present invention.

In FIG. 2A, statement S1 is a copy statement using array A and array B, and statement S2 is a transpose statement using array C and array A. An array for statements S1 and S2 where n=2 is shown in FIG. 2B.

The affine-partitioning framework computes the mappings for statements S1 and S2, respectively. One-dimensional processor space is assumed.

Affine partitioning produces mappings that may take the form of affine expressions (also referred to as affine functions). A linear transformation of induction variables is applied to each statement S1 and S2. The resulting affine expression represents a vector of constants and nodes in an array, respectively. The goal of the linear transformation is to find a common outermost parallel loop of all the statements. Each statement has a different transformation, and each parallel transformation may be dispatched to a different processor (or core) of a multiprocessor system.

Space partitioning is performed after the linear transformation to separate code into several partitions as well as making sure there is no loop-carried dependence at the outermost loop. The partitions may be assigned to different processors for parallelization. The partitions are setup so that processors executing operations in different partitions need not synchronize with each other.

The affine partition mappings of S1 and S2 are shown in FIG. 3 as Affine Expression (AE) 1 and AE2. For the computation of S1, a location (J,K) computes to J, and for S2, a location (J,K) computes to K. For example, in FIG. 2B, at array position (1,2), the solution to S1 is 1. For array position (1,2), the solution to statement S2 is 2.

AE1 and AE2 partition the statements S1 and S2 perpendicularly, which successfully co-locates all the accesses A[J, K] and A[K,J] in S1 and S2 of a given memory location into the same partition. Assuming the arrays are stored row-major, as in the 'C' language, these mappings yield better locality because the affine-partitioned code will traverse both array A and B in row-major and only array C in column-major.

Coalescing

Figures 4, 5, 6:
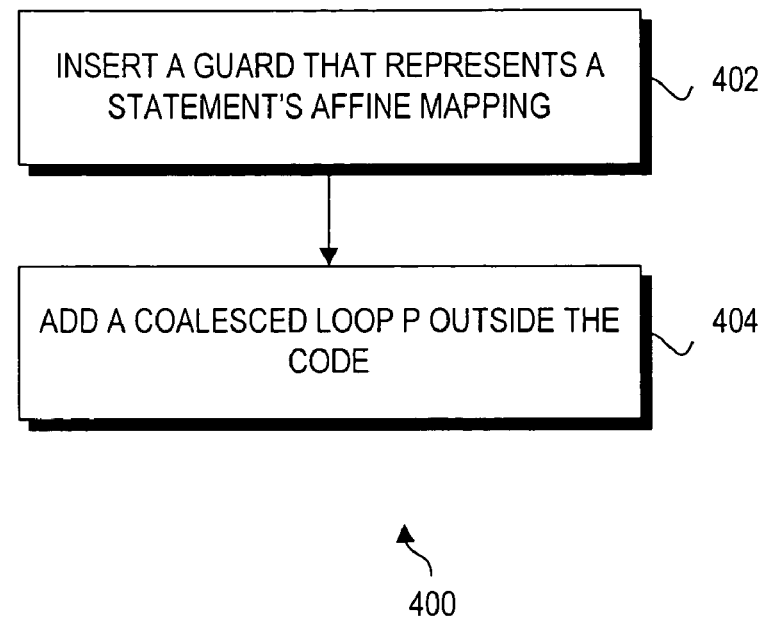
FIG. 4 is a flowchart illustrating the logic and operations to generate efficient parallel code in accordance with an embodiment of the present invention.
FIG. 5 shows stencil code in accordance with an embodiment of the present invention.
FIG. 6 shows affine expressions in accordance with an embodiment of the present invention.

Coalescing combines the loop P's for statements into one loop P, where P represents a partition. Referring to FIG. 4, a flowchart 400 shows the logic and operations of an embodiment of coalescing. Starting in a block 402, for each statement, coalescing inserts a guard that represents that statement's affine mapping. In one embodiment, a guard includes an expression, such as an if-then statement, that guards the execution of the if-body. If the expression is evaluated to be true, then the if-body is executed.

Proceeding to a block 404, a coalesced loop P is added outside the code. That is, the coalesced loop P is added outside the statement(s) and inserted guard(s) that are part of the same partition.

An example is shown in the code of FIG. 5 which has two statements S3 and S4. Note that there are dependencies on both the J loop and the K loop because of A[J, K] vs. A[J, K-1] and B[J-1, K] vs. B[J, K]. To parallelize the loop, we need to assign each diagonal chain of alternating S3 and S4 in the iteration space to a processor. This way of parallelization not only satisfies the above dependence constraints but also co-locates the accesses to A[J, K] and A[J, K-1] to the same processor and thus, achieves locality in memory.

Performing affine partitioning generates the affine space-partitioning mappings AE3 and AE4 shown in FIG. 6.

For illustration, FIG. 7 shows the parallelized code for the code of FIG. 5. It will be understood that FIG. 7 is not showing coalescing as described herein, but showing the parallel nature of the code of FIG. 5. In FIG. 7, the parallelized code for S3 is shown at program P3 and the parallelized code for S4 is shown at P4. A partition P loop surrounds each statement. Note that partition P may also be viewed as the virtual processor number. The processor space is partitioned and the loop P is in parallel. As described herein, coalescing combines the two separate P loops in FIG. 7 into a single coalesced P loop. In this way, instead of programs P3 and P4 having to be assigned to separate processors to achieve parallelization, the coalescing allows both P loops to be executed in a single coalesced P loop by a single processor.

To illustrate coalescing, refer again to the code in FIG. 5. The coalescing will produce the loop shown in FIG. 8. The coalescing algorithm combines the loop P's for statements S3 and S4 into one loop P. First, for each statement S3 and S4, the coalescing algorithm inserts a guard that represents that statement's affine mapping. Referring to FIGS. 6 and 8, expression E3 of FIG. 8 represents AE3 of FIG. 6, and expression E4 of FIG. 8 represents AE4 of FIG. 6. E3 and E4 are the guards 802 and 804 that have been inserted. Also note that the S3 and S4 of FIG. 8 correspond to the code of FIG. 7.

Next, the coalesced loop P is added outside the statements S3 and S4, and guards E3 and E4. Note that the coalesced code of FIG. 8 is valid in that it will produce correct output when executed. Proof of this property of validity is shown in the following theorem.

The coalescing algorithm maintains valid code after each code generation step. As a result, the intermediate and final codes are more readable and easier to debug. The theorem below proves that the coalescing algorithm generates valid SPMD code.

THEOREM: Adding individual affine expressions to guard respective statements and then inserting the coalesced loop P will generate a correct SPMD program.

PROOF: Given a partition P, each statement S that is guarded by its affine expression, namely, "if (P==$\phi_s$)" will execute the exact instance for that partition. This follows the correctness of the affine partitioning algorithm. Furthermore, because we add the above guards to the original program, the lexicographical ordering among the dynamic instances in a partition is maintained. As a result, the resulting coalesced loop P contains the correct SPMD code. That is, each partition contains the exact instances and those instances are ordered lexicographically.

Optimization—Removing Degenerative Loops

The introduced loops and conditional expressions of coalescing may lower the uniprocessor performance of the code despite the improved parallelism and locality. The optimization embodiments herein aim at eliminating as many as possible the guards and loop levels that the coalescing method may introduce.

The following examples demonstrate that embodiments of the optimization algorithm simplifies the resulting loop structures, conditional expressions and array access functions and generates efficient code.

A loop is degenerate if any statement in the loop is executed at most once. The coalescing algorithm may generate degenerate loops. FIG. 9 shows an embodiment of pseudo-code for removing degenerative loops. FIG. 9 will be discussed in connection with examples in FIGS. 8 and 10, but it will be understood the embodiment of FIG. 9 is not limited to these examples. As a reminder, FIG. 8 includes the code that was coalesced in the previous section.

In FIG. 9, the pseudo-code begins on line 902, where for each statement S, for each loop level J for S (line 904) the logic determines if S is degenerate with respect to the loop level J (line 906). Referring to FIG. 8, the code contains a degenerate loop, the loop K, because S1 and S2 are executed at most once with respect to loop K.

Proceeding to line 908 of FIG. 9, the logic solves the expression guarding S for J and assigns the solution to J'. In FIG. 8, loop K can be eliminated by solving the expressions E1 that guards S1 and expression E2 that guards S2. By solving, the logic obtains K1=J−P from E1 and K2=J−P+1 from E2.

Proceeding to line 912 in FIG. 9, the expression previously guarding S is added on J' to honor the bounds of degenerate loop J. The code after applying degenerate loop removal is shown in FIG. 10. The expressions solved for S1 and S2 are shown at 1002 and 1004, respectively. Note that two guards (as two conditional expressions) are inserted in the code of FIG. 10, shown at 1006 and 1008, because the boundary conditions of the loop K for statements S1 and S2 need to be maintained.

Optimization—Removing Guards

After removing degenerate loops in the previous section, the code of FIG. 10 may be further optimized by removing the guards. The guards may be removed by partitioning the values of P into intervals. The resulting code after removing the guards for the program in FIG. 10 is shown in FIG. 11. FIG. 11 shows a partition 1102 for P>=1, and a partition 1104 if P<=0. It will be noted that in FIG. 11, computations for K, such as loops or expressions, have been eliminated.

Code generated by embodiments herein is more readable than the previous code generation algorithms. For example, FIG. 12 shows conventional code generated for the code of FIG. 5 using the algorithm in "Scanning Polyhedra with DO loops," C. Ancourt, F. Irigoin, *Proceedings of the Third ACM/SIGPLAN Symposium on Principles and Practice of Parallel Programming*, pages 39-50, April, 1991. The code of FIG. 12 contains five guards, such as guard 1202, and thirteen lines of code. In comparison, the generated parallel code in FIG. 11, in accordance with embodiments herein, for the code of FIG. 5 includes only two guards and eight lines of code.

Embodiments herein provide generation of efficient parallel code. Performance of the parallel code is enhanced because extra loop levels and complex conditional expressions caused by affine partitioning are reduced. Thus, runtime overhead and code size are reduced. Also, embodiments here provide valid code throughout the transformation process so the intermediate and final codes are more readable and easier to debug for both programmers and compiler developers.

Embodiment of a Computer System

Figure 13:
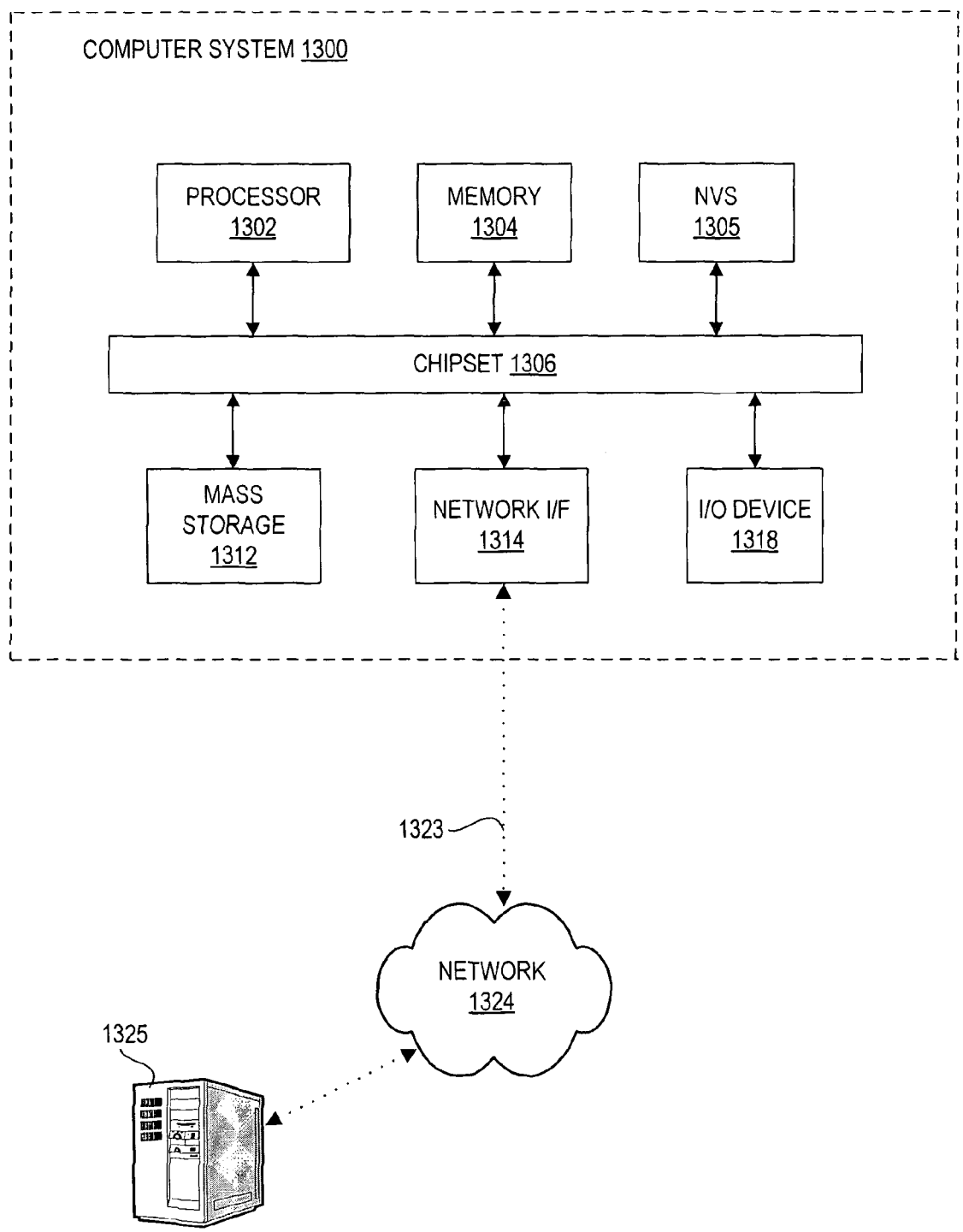
FIG. 13 is a block diagram illustrating one embodiment of a computer system to implement embodiments of the present invention.

FIG. 13 is an illustration of one embodiment of a computer system 1300 on which embodiments of the present invention may be implemented. In one embodiment, computer system 1300 may execute instructions for a parallelizing complier performing code generation in accordance with embodiments herein.

Computer system 1300 includes a processor 1302 and a memory 1304 coupled to a chipset 1306. Mass storage 1312, Non-Volatile Storage (NVS) 1305, network interface (I/F) 1314, and Input/Output (I/O) device 1318 may also be coupled to chipset 1306. Embodiments of computer system 1300 include, but are not limited to, a desktop computer, a notebook computer, a server, a personal digital assistant, a network workstation, or the like. In one embodiment, computer system 1300 includes processor 1302 coupled to memory 1304, processor 1302 to execute instructions stored in memory 1304.

Processor 1302 may include, but is not limited to, an Intel® Corporation x86, Pentium®, Xeon®, or Itanium® family processor, or the like. In one embodiment, computer system 1300 may include multiple processors. In another embodiment, processor 1302 may include two or more processor cores.

Memory 1304 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. In one embodiment, memory 1304 may include one or more memory units that do not have to be refreshed.

Chipset 1306 may include a memory controller, such as a Memory Controller Hub (MCH), an inpuvoutput controller, such as an Input/Output Controller Hub (ICH), or the like. In an alternative embodiment, a memory controller for memory 1304 may reside in the same chip as processor 1302. Chipset 1306 may also include system clock support, power management support, audio support, graphics support, or the like. In one embodiment, chipset 1306 is coupled to a board that includes sockets for processor 1302 and memory 1304.

Components of computer system 1300 may be connected by various interconnects. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like. I/O device 1318 may include a keyboard, a mouse, a display, a printer, a scanner, or the like.

Computer system 1300 may interface to external systems through network interface 1314. Network interface 1314 may include, but is not limited to, a modem, a Network Interface Card (NIC), or other interfaces for coupling a computer system to other computer systems. A carrier wave signal 1323 may be received/transmitted by network interface 1314. In the embodiment illustrated in FIG. 13, carrier wave signal 1323 is used to interface computer system 1300 with a network 1324, such as a Local Area Network (LAN), a Wide Area Network (WAN), the Internet, or any combination thereof. In one embodiment, network 1324 is further coupled to a computer system 1325 such that computer system 1300 and computer system 1325 may communicate over network 1324.

Computer system 1300 also includes non-volatile storage 1305 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Mass storage 1312 includes, but is not limited to, a magnetic disk drive, a magnetic tape drive, an optical disk drive, or the like. It is appreciated that instructions executable by processor 1302 may reside in mass storage 1312, memory 1304, non-volatile storage 1305, or may be transmitted or received via network interface 1314.

In one embodiment, computer system 1300 may execute an Operating System (OS). Embodiments of an OS include Microsoft Windows®, the Apple Macintosh operating system, the Linux operating system, the Unix operating system, or the like.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., Read-Only Memory (ROM), Random Access Memory (RAM), magnetic disk storage media, optical storage media, a flash memory device, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-accessible medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method comprising:
   performing affine partitioning on a code having statements, the affine partitioning to generate affine partitioning mapping for the statements by reorganizing computations in each processor of a multi-processor computer system;
   generating a parallel code based on the affine partitioning mappings, wherein generating the parallel code includes:
     coalescing loops in the parallel code generated from the affine partitioning mappings to generate coalesced parallel code; and
     optimizing the coalesced parallel code by removing a degenerative loop from the coalesced parallel code, the removing of the degenerative loop at a first loop level of a statement from the statements, wherein the statement is degenerate with respect to the first loop level, the removing comprising:
       solving an expression serving as a guard on the statement for the first loop level;
       replacing the degenerative loop with the solution for the expression; and
       adding the guard to a solution for the expression; and
   executing the optimized coalesced parallel code concurrently on each processor of the multi-processor computer system.

2. The method of claim 1, wherein coalescing the loops includes inserting the guard in the code, and wherein the guard represents the affine mapping of the statement.

3. The method of claim 2, wherein coalescing the loops includes adding a coalesced loop outside of the statement and the inserted guard.

4. The method of claim 3, further comprising removing the guard by partitioning values of the coalesced loop added outside of the statement into two or more intervals.

5. The method of claim 1, further comprising removing the guard added during removal of the degenerative loop.

6. The method of claim 1, wherein the parallel code includes a Single Program Multiple Data (SPMD) code.

7. An article of manufacture, comprising a machine-accessible medium including instructions that, if executed by a machine, will cause the machine to perform operations comprising:

performing affine partitioning on a code having statements, the affine partitioning to generate affine partitioning mappings; and generating a parallel code based on the affine partitioning mappings, wherein generating the parallel code includes:

coalescing loops in the parallel code generated from the affine partitioning mappings to generate coalesced parallel code; and optimizing the coalesced parallel code by removing a degenerative loop from the coalesced parallel code, the removing of the degenerative loop at a first loop level of a statement from the statements, wherein the statement is degenerate with respect to the first loop level, the removing comprising:

solving an expression serving as a guard on the statement for the first loop level;

replacing the degenerative loop with the solution for the expression; and adding the guard to a solution for the expression.

8. The article of manufacture of claim 7, wherein coalescing the loops includes inserting the guard in the code, and wherein the guard represents the affine mapping of the statement.

9. The article of manufacture of claim 8, wherein coalescing the loops includes adding a coalesced loop outside of the statement and the inserted guard.

10. The article of manufacture of claim 9, wherein the machine-accessible medium further includes instructions that, if executed by the machine, will cause the machine to perform operations comprising:

removing the guard by partitioning values of the coalesced loop added outside of the statement into two or more intervals.

11. The article of manufacture of claim 7, wherein the machine-accessible medium further includes instructions that cause the machine to perform operations comprising:

removing the guard added during removal of the degenerative loop.

12. The article of manufacture of claim 7, wherein the instructions are part of a parallelizing compiler.

13. A computer system comprising:

a processor;

a Synchronized Dynamic Random Access Memory (SDRAM) coupled with the processor; and a storage unit coupled with the processor, wherein the storage unit including instructions which when loaded into the SDRAM and executed by the processor perform operations comprising:

performing affine partitioning on a code having statements, the affine partitioning to generate affine partitioning mappings for the statements; and generating a parallel code based on the affine partitioning mappings, wherein generating the parallel code includes:

coalescing loops in the parallel code generated from the affine partitioning mappings to generate coalesced parallel code; and optimizing the coalesced parallel code by removing a degenerative loop from the coalesced parallel code, the removing of the degenerative loop at a first loop level of a statement from the statements, wherein the statement is degenerate with respect to the first loop level, the removing comprising:

solving an expression serving as a guard on the statement for the first loop level;

replacing the degenerative loop with the solution for the expression; and adding the guard to a solution for the expression.

14. The computer system of claim 13, wherein coalescing the loops includes:

inserting a guard in the code, and wherein the guard represents the affine mapping of the statement; and adding a coalesced loop outside of the statement and the inserted guard.

\* \* \* \* \*